(12) United States Patent
Winkler et al.

(10) Patent No.: US 12,454,175 B2
(45) Date of Patent: Oct. 28, 2025

(54) ELECTRICALLY DRIVEABLE DRIVE AXLE FOR AN ALL-TERRAIN UTILITY VEHICLE, AND UTILITY VEHICLE

(71) Applicant: ZF Friedrichshafen AG, Friedrichshafen (DE)

(72) Inventors: Maximilian Winkler, Schöllnach (DE); Alexander Mühlbauer, Windorf (DE); Florian Felbinger, Kassel (DE); Willi Rometsch, Kassel (DE); Franz Reitinger, Esternberg (AT); Johannes Auburger, Regenstauf (DE); Ulrich Solka, Fuerstenzell (DE); Hendrik Frisch, Kassel (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 41 days.

(21) Appl. No.: 18/330,065

(22) Filed: Jun. 6, 2023

(65) Prior Publication Data
US 2023/0398862 A1 Dec. 14, 2023

(30) Foreign Application Priority Data
Jun. 13, 2022 (DE) .................. 10 2022 205 958.1

(51) Int. Cl.
*F16H 37/04* (2006.01)
*B60K 1/02* (2006.01)
(Continued)

(52) U.S. Cl.
CPC .............. *B60K 17/046* (2013.01); *B60K 1/02* (2013.01); *B60K 17/08* (2013.01); *B60T 1/005* (2013.01);
(Continued)

(58) Field of Classification Search
CPC ...... B60K 17/046; B60K 17/08; B60K 17/30; B60K 17/06; B60K 17/34; B60K 1/02;
(Continued)

(56) References Cited

U.S. PATENT DOCUMENTS 1,543,044 A 6/1925 Anglada
4,803,897 A * 2/1989 Reed ...................... B62D 11/10
475/6

(Continued)

FOREIGN PATENT DOCUMENTS

CN 103332109 A * 10/2013
DE 10 2016 006 208 A1 11/2017
(Continued)

OTHER PUBLICATIONS

German Patent Office, Office Action issued in German patent application No. 10 2022 205 958.1 (Jan. 25, 2023).

*Primary Examiner* — Farhana Pervin
(74) *Attorney, Agent, or Firm* — Finch & Maloney PLLC

(57) ABSTRACT

An electrically driveable drive axle (19) is disclosed for an all-terrain utility vehicle. The first drivetrain (20) has a first electric motor (21), a first transmission (22), and a first drive output (23). A second drivetrain (30) has a second electric motor (31), a second transmission (32), and a second output (33). The first drivetrain (20) and the second drivetrain (30) are arranged in a common housing (40) and/or on the common housing (40) where the first drivetrain (20) forms a first torque path and the second drivetrain (30) forms a second torque path. The first torque path and the second torque path are mechanically separate from one another. A corresponding vehicle is also disclosed.

9 Claims, 1 Drawing Sheet

(51) Int. Cl.
  *B60K 17/04* (2006.01)
  *B60K 17/08* (2006.01)
  *B60T 1/00* (2006.01)
  *F16H 57/038* (2012.01)
  *F16H 57/02* (2012.01)

(52) U.S. Cl.
  CPC ........... *F16H 37/04* (2013.01); *F16H 37/041* (2013.01); *F16H 57/038* (2013.01); *F16H 2057/02034* (2013.01); *F16H 2057/02056* (2013.01); *F16H 2200/0021* (2013.01); *F16H 2200/2005* (2013.01)

(58) Field of Classification Search
  CPC .... B60K 2007/0046; B60K 2007/0076; B60K 7/0007; B60K 2007/0069; B60T 1/005; F16H 37/04; F16H 37/041; F16H 57/038; F16H 2057/02034; F16H 2057/02056; F16H 2200/0021; F16H 2200/2005; F16H 2200/0034; F16H 2200/2035; F16H 2200/2064; F16H 2200/2094; F16H 3/54; F16H 63/345; B62D 11/04; B60Y 2410/10
  See application file for complete search history.

(56) References Cited

U.S. PATENT DOCUMENTS

| | | |
|---|---|---|
| 5,285,866 A | 2/1994 | Ackroyd |
| 7,854,674 B2 | 12/2010 | Freudenreich |
| 12,024,027 B2 * | 7/2024 | Wright .................. F16H 37/065 |
| 2005/0227803 A1 * | 10/2005 | Holmes .................. B60K 6/365 |
| | | 475/204 |
| 2006/0243512 A1 * | 11/2006 | Grabmaier ............... B60K 6/46 |
| | | 180/242 |
| 2008/0202826 A1 * | 8/2008 | Freudenreich ......... B60K 17/08 |
| | | 180/6.5 |
| 2011/0139522 A1 * | 6/2011 | Takenaka ............... H02K 16/00 |
| | | 180/65.1 |
| 2012/0015772 A1 * | 1/2012 | Kira ....................... B60K 6/442 |
| | | 903/910 |
| 2015/0306955 A1 * | 10/2015 | Knoblauch .......... B60K 17/356 |
| | | 180/242 |
| 2019/0283574 A1 * | 9/2019 | Hummel ............... B60K 17/354 |
| 2019/0315216 A1 * | 10/2019 | Ziech ........................ B60K 6/26 |
| 2019/0331200 A1 * | 10/2019 | Barendrecht ........ B60K 17/046 |
| 2020/0282827 A1 * | 9/2020 | Kaltenbach ............... B60K 1/02 |
| 2020/0284338 A1 * | 9/2020 | Suyama .................. B60L 15/20 |
| 2021/0033182 A1 * | 2/2021 | Murakami .......... B60K 23/0808 |
| 2021/0086612 A1 * | 3/2021 | Imamura ............. B60K 17/346 |
| 2023/0219409 A1 * | 7/2023 | Okuda ................. B60K 7/0007 |
| | | 180/65.6 |

FOREIGN PATENT DOCUMENTS

| | | |
|---|---|---|
| DE | 10 2018 206 411 A1 | 10/2019 |
| EP | 0 498 340 A1 | 8/1992 |
| EP | 0 965 511 A2 | 12/1999 |
| FR | 1018160 | 12/1952 |

* cited by examiner

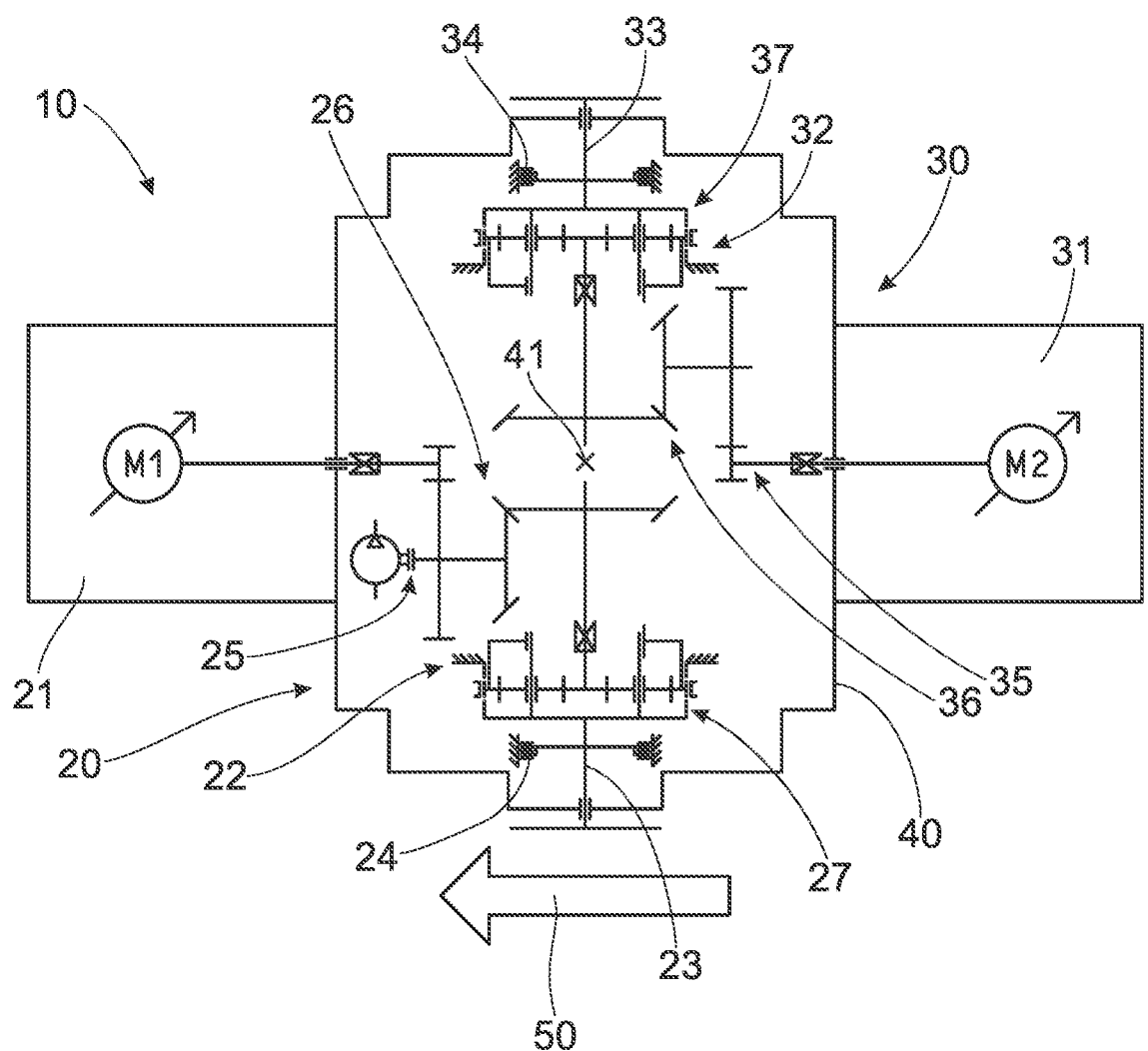

ELECTRICALLY DRIVEABLE DRIVE AXLE FOR AN ALL-TERRAIN UTILITY VEHICLE, AND UTILITY VEHICLE

RELATED APPLICATIONS

This application claims the benefit of and right of priority under 35 U.S.C. § 119 to German Patent Application no. 10 2022 205 958.1, filed on 13 Jun. 2022, the contents of which are incorporated herein by reference in its entirety.

FIELD OF THE DISCLOSURE

The present invention relates to an electrically driveable drive axle for an all-terrain utility vehicle, as per the preamble of claim 1, and to a corresponding utility vehicle.

BACKGROUND

Various kinds of electrically driven and all-terrain utility vehicles, such as wheeled loaders, heavy goods vehicles, mine vehicles or light wheeled tanks, are known in the prior art. These electrically driven utility vehicles are either purely electrically driven, that is to say they have exclusively an electrical battery or an electrical storage battery for their energy supply, or they have a diesel-electric drive, which means that the required energy is provided by a diesel-powered generator, commonly in conjunction with an electrical buffer store, for example a correspondingly dimensioned capacitor. In all cases, the mechanical power required for the traction drive and for the working drive is imparted by one or more electric motors.

In this context, DE 10 2018 206 411 A1 has disclosed a drivetrain for a work machine, which drivetrain has a front axle with an electric front-axle drive unit and has a rear axle with an electric rear-axle drive unit. The drivetrain furthermore has a switchable clutch that can establish a drive connection between the front-axle drive unit and the rear-axle drive unit.

DE 10 2016 006 208 A1 has disclosed a drive device for a motor vehicle drivetrain, which drive device is configured for an electric vehicle in the form of a utility vehicle. Here, in one variant, said drive device comprises two electric machines, downstream of which a transmission is connected. In the transmission, different transmission ratios can be engaged in order to couple one or both electric machines to an output side of the transmission. Here, the output side is coupled to at least one drive output, to which in each case one drive axle of the electric vehicle is connected within the motor vehicle drivetrain.

SUMMARY

Known electrically operable drivetrains are however disadvantageous insofar as they always have a mechanical coupling between at least the drive output sides of an axle, which limits the possibilities for torque distribution between the drive motors and the wheels. Furthermore, they have little or no integration with regard to their functionalities. Furthermore, previously known compact drive axles do not allow multi-stage gearshifts in separate torque paths.

It is an object of the invention to propose an improved electrically driveable drive axle.

Said object is achieved according to the invention by means of the electrically driveable drive axle as variously disclosed herein. Advantageous embodiments and refinements of the invention will be apparent in light of the present disclosure.

The invention relates to an electrically driveable drive axle for an all-terrain utility vehicle, comprising a first drivetrain with a first electric motor, with a first transmission and with a first drive output, and comprising a second drivetrain with a second electric motor, with a second transmission and with a second output, wherein the first drivetrain and the second drivetrain are arranged in a common housing and/or on the common housing, and wherein the first drivetrain forms a first torque path and the second drivetrain forms a second torque path. The drive axle according to the invention is characterized in that the first torque path and the second torque path are mechanically separate from one another.

The invention thus describes an electrically operable or driveable drive axle. The drive axle is in particular configured to drive an all-terrain utility vehicle, for example a crane, a light wheeled tank or an all-wheel-drive heavy goods vehicle. Use in a utility vehicle necessitates that the drive axle must be configured for continuous operation with very high absolute and relative power in relation to passenger motor vehicle operation or even road-bound heavy goods vehicle operation. For example, the drive axle according to the invention must be configured to provide more than 50% or more than 75% of its maximum power over relatively long coherent periods of time. An electrically driveable drive axle of a passenger motor vehicle, for example, would not be suitable for this purpose.

The drive axle according to the invention comprises a first drivetrain and a second drivetrain, wherein the first drivetrain in turn comprises a first electric motor, a first transmission and a first drive output, and wherein the second drivetrain in turn comprises a second electric motor, a second transmission and a second drive output.

The first electric motor and the second electric motor are preferably of structurally identical form, that is to say are preferably identical electric motors.

The first and the second electric motor may be configured in each case as a synchronous or asynchronous machine, in particular as three-phase synchronous or three-phase asynchronous machines.

The first and the second electric motor are advantageously each assigned an inverter that converts DC electrical current, which is preferably provided by an electrical battery, into alternating current that is suitable for the actuation or operation of the first and the second electric motor.

The first and the second transmission are preferably also of structurally identical form, such that these, too, are preferably identical transmissions, in particular with regard to the transmission ratio achieved.

The first and the second transmission are preferably configured as speed reduction transmissions. The first and the second transmission may each comprise multiple transmission stages.

The first drive output and the second drive output are advantageously configured as wheel drive outputs, and are for example each configured as a drive output shaft with a wheel hub for the mounting of a wheel. It is alternatively preferable for the first drive output and the second drive output to be configured exclusively as a first and a second drive output shaft, wherein the first and the second drive output shaft may for example each have a drive connection to a cardan shaft, such that the cardan shafts are driven by the first and the second drive output shaft.

The drive axle according to the invention furthermore comprises a common housing that entirely or partially encloses the first drivetrain, that is to say the first electric motor, the first transmission and the first drive output, and the second drivetrain, that is to say the second electric motor, the second transmission and the second drive output. At least the first transmission and the second transmission are in this case advantageously arranged within the common housing. The first and the second drive output may be arranged partially in the housing and extend partially outwards from the housing; for example, axial ends of the drive output shafts with the wheel hubs may extend outwards. The first and the second electric motor may either be arranged entirely in the housing or may be arranged on the outside of the housing.

Here, arranging the first and the second electric motor in the housing has the advantage that the first and the second electric motor can for example be connected to a cooling and lubrication management system arranged in the housing.

By contrast, arranging the first and the second electric motor on the outside of the housing allows a relatively flexible arrangement of the electric motors, and possibly better utilization of the available structural space. For example, the first and the second electric motor may be arranged directly on the housing, or may be arranged on the housing via a connecting shaft, in particular via a cardan shaft.

The first drivetrain forms a first torque path, wherein the first torque path runs from the first electric motor to the first drive output via the first transmission. Likewise, the second drivetrain forms a second torque path, wherein the second torque path runs from the second electric motor to the second drive output via the second transmission.

According to the invention, provision is now made whereby the first torque path and the second torque path are mechanically separate from one another. This means that there is absolutely no mechanical connection for the transmission of drive power between the first drivetrain and the second drivetrain, in particular not even via a separable clutch or a differential.

This yields the advantage that the first drive output and the second drive output can be controlled entirely independently of one another. For example, these can be operated at different rotational speeds, in order to assist in a cornering manoeuvre, or even with opposite directions of rotation.

This flexible operation of the drive axle according to the invention advantageously makes it possible to use two or more drive axles according to the invention to drive a vehicle, for example for a 4×2 vehicle up to a 10×10 vehicle. There is no need here for mechanical coupling of the drive axles according to the invention; on the contrary, a mechanical coupling would specifically negate the flexibility of the drive axle.

The omission of coupling elements between the first drivetrain and the second drivetrain furthermore results in a relatively compact construction.

By contrast to classic drive axles, the drive axle according to the invention therefore has no mechanical coupling of the drive outputs, and is thus relatively compact.

Therefore, in the classic sense, the invention combines an axle drive or transfer case with an automatic transmission.

The drive axle may for example be configured as a non-steerable and thus inexpensive and particularly compact drive axle.

In one preferred embodiment of the invention, provision is made whereby the first transmission comprises a first spur-gear stage, a first bevel-gear stage and a first planetary gear set, and the second transmission comprises a second spur-gear stage, a second bevel-gear stage and a second planetary gear set.

The first torque path in the first transmission advantageously runs from the first spur-gear stage, via the first bevel-gear stage and the first planetary gear set, to the first drive output. Likewise, the second torque path in the second transmission advantageously runs from the second spur-gear stage, via the second bevel-gear stage and the second planetary gear set, to the second drive output. By virtue of the fact that the first and the second planetary gear set are in each case the final stage in the torque path of the first and of the second transmission respectively, the final torque increase takes place in each case at the transmission output, thus reducing the mechanical load on the components that precede the first and the second planetary gear set in the first and the second torque path respectively.

In one particularly preferred embodiment of the invention, provision is made whereby the first spur-gear stage creates a first height offset of the first electric motor with respect to the first drive output, and the second spur-gear stage creates a second height offset of the second electric motor with respect to the second drive output. Since the first spur-gear stage is the input stage of the first transmission and the second spur-gear stage is correspondingly the input stage of the second transmission, said spur-gear stages have a direct drive connection, or an indirect drive connection via a clutch, to the first electric motor and to the second electric motor respectively. By virtue of the fact that an axis of an input spur gear of the first spur-gear stage and an axis of the second spur-gear stage are arranged higher than an axis of an output spur gear of the first spur-gear stage and of the second spur-gear stage respectively, the first and the second electric motor can also be arranged higher on the common housing. The clearance underneath the first and the second electric motor is thus increased, thus allowing, for example, a greater diameter and a shorter construction of the first and of the second electric motor.

In a further particularly preferred embodiment of the invention, provision is made whereby the first planetary gear set is of multi-stage configuration and the second planetary gear set is of multi-stage configuration. This yields the advantage that different transmission ratios can be implemented in each case, such that the drive power of the first and of the second electric motor can be converted into a high rotational speed or a high torque as required, thus increasing the possible uses and thus the utility of the drive axle. For example, one transmission ratio stage may be provided for on-road travel, and further transmission ratio stages may be provided for terrain of different levels of difficulty. It is thus also possible for different driving manoeuvres to be performed on different types of terrain.

The first planetary gear set is advantageously capable of performing gearshifts independently of the second planetary gear set, such that the first torque path has a different transmission ratio than the second torque path.

It is preferable here that a reduction of the respective rotational speed of the first and of the second electric motor takes place in each transmission ratio stage, wherein the transmission ratio stages differ by the fact that they respectively reduce the rotational speed of the first and of the second electric motor to different degrees.

In a further particularly preferred embodiment of the invention, provision is made whereby the first bevel-gear stage is configured to divert the first torque path through 90°, and the second bevel-gear stage is configured to divert the second torque path through 90°. This thus means that an input element of the first and of the second bevel-gear stage, and all elements of the first and of the second drivetrain in the first and in the second torque path upstream of the input element of the first and of the second bevel-gear stage, respectively, are arranged at right angles with respect to an output element of the first and of the second bevel-gear stage, and all elements of the first and of the second drivetrain in the first and in the second torque path downstream of the output element of the first and of the second bevel-gear stage, respectively. This allows better utilization of the available structural space, and thus a more compact design of the drive axle.

Since the first electric motor is thus arranged at a 90° angle with respect to the first drive output and the second electric motor is likewise arranged at a 90° angle with respect to the second drive output, the structural length of the first and of the second electric motor can be increased as required, without increasing the track width of the drive axle. This allows easy scaling of the power requirements.

Alternatively, the first and the second bevel-gear stage may also be configured to divert the first torque path and the second torque path, respectively, by more than or less than 90°. Furthermore, the diversion need not imperatively be realized in a plane parallel to the underlying surface, but may also comprise a vertical component in addition to a horizontal component.

In a further particularly preferred embodiment of the invention, provision is made whereby the first drivetrain and the second drivetrain are arranged symmetrically about a vertical axis of the housing, wherein the first electric motor is arranged in a direction of travel of the drive axle and the second electric motor is arranged counter to the direction of travel of the drive axle. This symmetrical arrangement allows not only a simplification of the design of the drive axle and the use of a large number of identical parts but also the most efficient possible utilization of the available structural space, which likewise contributes to a more compact form of the drive axle.

It is alternatively preferably possible for the first electric motor to be arranged laterally on the drive axle, and for the second electric motor to likewise be arranged laterally on the axle, opposite the first electric motor. The first and the second drive output are then oriented in the direction of travel and oppositely to the direction of travel, respectively.

Here, the first motor points in the direction of travel, and the first drive output may be arranged on the left or on the right in the direction of travel depending on the orientation of the first bevel-gear stage. The second motor points counter to the direction of travel, and the second drive output may be arranged on the left or on the right in the direction of travel depending on the orientation of the second bevel-gear stage. The first electric motor is thus situated symmetrically opposite the second electric motor, and the first drive output is situated symmetrically opposite the second drive output. Likewise, the first transmission and the second transmission are situated mirror-symmetrically opposite one another in relation to the vertical axis.

In a further particularly preferred embodiment of the invention, provision is made whereby the first electric motor is arranged on the housing by means of a first flange connection, and the second electric motor is arranged on the housing by means of a second flange connection. Here, a flange connection is a so-called neutral connection, that is to say a non-proprietary connection, whereby the housing can be easily coupled to different types or embodiments of first and second electric motors. The housing is however also couplable to drive units other than electric motors; for example, it is also possible for hydraulic motors to be arranged on the housing in order to drive the first drive output and the second drive output. This promotes the possibilities for using the drive axle not only in wheeled vehicles but also in tracked vehicles, construction machines and other special vehicles.

In a further particularly preferred embodiment of the invention, provision is made whereby the first drivetrain furthermore comprises a first immobilizing brake, and the second drivetrain furthermore comprises a second immobilizing brake. The first immobilizing brake is advantageously arranged in the first torque path downstream of the first planetary gear set and upstream of the first drive output. Likewise, the second immobilizing brake is advantageously arranged in the second torque path downstream of the second planetary gear set and upstream of the second drive output. Thus, for example when a neutral stage is engaged in the first and in the second transmission, unintentional rolling of a vehicle that has the drive axle can be prevented. Altogether, the first and the second immobilizing brake extend the functional scope of the drive axle and thus increase the utility thereof.

In a further particularly preferred embodiment of the invention, provision is made whereby the housing is of multi-part form. The multi-part form of the housing simplifies both the production of the housing and the installation of the first and of the second drivetrain in the common housing. Independently of the multi-part form of the housing, a common oil sump for the first and the second drivetrain is advantageously provided in the housing, such that the first and the second drivetrain have a common lubrication and cooling management system.

In a further particularly preferred embodiment of the invention, provision is made whereby the drive axle is configured to be steerable. For example, the first and the second drive output shaft may each have a joint and a steering actuator for generating a steering movement. It is thus possible for a vehicle to be equipped exclusively with drive axles according to the invention, without being reliant on a further, separate steering axle. Also, a multiplicity of drive axles according to the invention may be arranged one behind the other on a vehicle and, in a manner dependent on their position on the vehicle, set a steering angle appropriate to a driver input, that is to say follow the steering input at a front axle by appropriately steering concomitantly. It is furthermore conceivable and preferable for a drive axle according to the invention that is used as a rear axle to set a steering angle that is opposed to that at the front axle, so as to allow the vehicle to turn in as small a space as possible. By contrast to the wheels on different sides of the vehicle being driven in opposite directions, it is thus possible for increased tyre wear to be avoided, in particular on an underlying surface with a high friction coefficient.

The invention furthermore relates to a utility vehicle comprising at least one drive axle according to the invention. The advantages already described are thus also obtained for the utility vehicle according to the invention.

The vehicle is preferably an all-terrain work machine, a crane, an all-wheel drive heavy goods vehicle, a light wheeled tank or an all-terrain special vehicle.

The invention will be discussed by way of example below on the basis of embodiments illustrated in the FIGURES.

BRIEF DESCRIPTION OF THE DRAWING

In the FIGURES:

FIG. 1 is the sole FIGURE and shows, by way of example and in schematic form, a possible embodiment of an electrically driveable drive axle according to the invention for an all-terrain utility vehicle.

Identical items, functional units and similar components are denoted by the same reference designations throughout the figures. These items, functional units and similar components are of identical design in terms of their technical features unless the description explicitly or implicitly states otherwise.

DETAILED DESCRIPTION

FIG. 1 shows, by way of example and in schematic form, a possible embodiment of an electrically driveable drive axle 10 according to the invention for an all-terrain utility vehicle, for example for a light wheeled tank.

The drive axle 10 comprises a first drivetrain 20 with a first electric motor 21, with a first transmission 22, with a first drive output 23 and with a first immobilizing brake 24, and comprises a second drivetrain 30 with a second electric motor 31, with a second transmission 32, with a second drive output 33 and with a second immobilizing brake 34. Here, the first drivetrain 20 forms a first torque path and the second drivetrain 30 forms a second torque path, wherein the first torque path runs from the first electric motor 21 via the first transmission 22 to the first drive output 23 and the second torque path correspondingly runs from the second electric motor 31 via the second transmission 32 to the second drive output 33.

In the example, the common housing 40 is of multi-part form and has a common oil sump for the first drivetrain 20 and the second drivetrain 30.

In the example, the first transmission 22 is composed of a first spur-gear stage 25, a first bevel-gear stage 26 and a first planetary gear set 27. Correspondingly, in the example, the second transmission 32 is composed of a second spur-gear stage 35, a second bevel-gear stage 36 and a second planetary gear set 37.

The first spur-gear stage 25 not only generates a rotational speed reduction but also creates a first height offset of the first electric motor 21 with respect to the first drive output 23. Analogously, the second spur-gear stage 35 not only generates a rotational speed reduction but also creates a second height offset of the second electric motor 31 with respect to the second drive output 33.

The first planetary gear set 27 and the second planetary gear set 37 are each of multi-stage configuration and capable of performing gearshifts independently of one another.

As can be seen, the first transmission 22 and a major part of the first drive output 23 are arranged in the common housing 40. Only the first electric motor 21 is arranged on the outside of the housing 40 by way of a flange connection (not illustrated in FIG. 1). A drive output shaft of the first drive output 23 likewise extends out of the housing 40. Likewise, the second transmission 32 and a major part of the second drive output 33 are arranged in the common housing 40. Only the second electric motor 31 is arranged on the outside of the housing 40 by way of a flange connection (not illustrated in FIG. 1). A drive output shaft of the second drive output 33 likewise extends out of the housing 40.

The first bevel-gear stage 26 is configured to divert the first torque path through 90°. Correspondingly, the second bevel-gear stage 36 is configured to divert the second torque path through 90°.

As can likewise be seen, the first torque path formed by the first drivetrain 20 and the second torque path formed by the second drivetrain 30 are mechanically completely separate from one another.

Here, the first drivetrain 20 and the second drivetrain 30 are arranged with point symmetry about a vertical axis 41 of the housing 40. As can be seen, the first electric motor 21 is arranged in a direction of travel (illustrated by the arrow 50) of the drive axle 10, and the second electric motor 31 is arranged counter to the direction of travel of the drive axle 10.

The drive axle 10 thus comprises a multiplicity of functions, such as the multi-stage configuration of the first and the second planetary gear set 27, 37, the first and the second immobilizing brake 24, 34, separate torque paths, and two mutually independently operable electric motors 21, 31, in a particularly compact embodiment.

Aside from creating a height offset, the first and the second spur-gear stage 25, 35 generate a rotational speed reduction. The height offset in turn makes it possible for the first and the second electric motor 21, 31 to be arranged on the housing 40 so as to have a greater ground clearance. It is however likewise also possible to use electric motors 21, 31 with a relatively large diameter.

The illustrated positioning of the first and of the second planetary gear set 27, 37, and thus the increase in torque at the transmission output, reduce the load on the preceding components in the torque paths.

The drive axle 10 according to the invention exhibits such variability that it can be used flexibly as a drive axle in multi-axle utility vehicles from 4×2 to 10×10.

REFERENCE DESIGNATIONS

10 Drive axle
20 First drivetrain
21 First electric motor
22 First transmission
23 First drive output
24 First immobilizing brake
25 First spur-gear stage
26 First bevel-gear stage
27 First planetary gear set
30 Second drivetrain
31 Second electric motor
32 Second transmission
33 Second drive output
34 Second immobilizing brake
35 Second spur-gear stage
36 Second bevel-gear stage
37 Second planetary gear set
40 Housing
41 Vertical axis
50 Arrow, direction of travel

The invention claimed is:

1. An electrically drivable drive axle for an all-terrain utility vehicle, comprising:
 a first drivetrain with a first electric motor, with a first transmission and with a first drive output; and
 a second drivetrain with a second electric motor, with a second transmission and with a second output;
 wherein the first transmission comprises a first spur-gear stage, a first bevel-gear stage, and a first planetary gear set, wherein the first spur gear stage connects an output shaft of the first electric motor to the first bevel-gear stage, and wherein the first planetary gear set is between the first bevel-gear stage and the first drive output;

wherein the second transmission comprises a second spur-gear stage, a second bevel-gear stage, and a second planetary gear set, wherein the second spur gear stage connects an output shaft of the second electric motor to the second bevel-gear stage, and wherein the second planetary gear set is between the second bevel-gear stage and the second drive output; and wherein the first drivetrain and the second drivetrain are arranged in a common housing and/or on the common housing, and wherein the first drivetrain forms a first torque path and the second drivetrain forms a second torque path, the first torque path being mechanically separate from the second torque path;

wherein the first drivetrain and the second drivetrain are arranged symmetrically about a vertical axis of the housing, and wherein the first electric motor is arranged in a direction of travel of the drive axle and the second electric motor is arranged counter to the direction of travel of the drive axle.

2. The drive axle according to claim 1, wherein:

the first spur-gear stage creates a first height offset of the first electric motor with respect to the first drive output; and the second spur-gear stage creates a second height offset of the second electric motor with respect to the second drive output.

3. The drive axle according to claim 1, wherein the first planetary gear set is of multi-stage configuration, and the second planetary gear set is of multi-stage configuration.

4. The drive axle according to claim 1, wherein the first bevel-gear stage is configured to divert the first torque path through 90°, and the second bevel-gear stage is configured to divert the second torque path through 90°.

5. The drive axle according to claim 1, wherein the first electric motor is arranged on the housing by means of a first flange connection, and the second electric motor is arranged on the housing by means of a second flange connection.

6. The drive axle according to claim 1, wherein the first drivetrain furthermore comprises a first immobilizing brake, and the second drivetrain furthermore comprises a second immobilizing brake.

7. The drive axle according to claim 1, wherein the housing is of multi-part form.

8. The drive axle according to claim 1, wherein the drive axle is configured to be steerable.

9. A utility vehicle, comprising at least one drive axle according to claim 1.

* * * * *